United States Patent [19]

Freeman

[11] 4,249,578
[45] Feb. 10, 1981

[54] LENGTH-ADJUSTABLE STIFFENER FOR FIBERBOARD DUCTS

[76] Inventor: James D. Freeman, 11 W. Grand Ct., Springfield, Ill. 62704

[21] Appl. No.: 43,362

[22] Filed: May 29, 1979

[51] Int. Cl.³ .............................................. F16L 9/04
[52] U.S. Cl. .................................... 138/172; 138/149; 138/178; 138/DIG. 4; 248/354 P
[58] Field of Search .............. 138/120, 155, 172, 177, 138/178, 149, DIG. 4; 85/14, 42; 248/354 P, 357; 52/632

[56] References Cited

U.S. PATENT DOCUMENTS

| 132,475 | 10/1872 | Linville | 138/172 X |
| 1,523,268 | 1/1925 | McColl | 138/DIG. 4 |
| 1,793,035 | 2/1931 | Whitney | 248/354 P X |
| 2,535,141 | 12/1950 | Kenney et al. | 248/354 P X |
| 3,118,363 | 1/1964 | Burgess | 248/354 P X |
| 3,776,253 | 12/1973 | Yamaguchi et al. | 138/172 X |
| 3,881,520 | 5/1975 | Murphy | 138/155 X |
| 4,158,896 | 6/1979 | Farkas | 248/354 P |

FOREIGN PATENT DOCUMENTS

| 475119 | 4/1915 | France | 138/149 |
| 719699 | 12/1954 | United Kingdom | 248/354 P |

Primary Examiner—James E. Bryant, III
Attorney, Agent, or Firm—Ralph F. Staubly

[57] ABSTRACT

Two telescopically mated tubes carry on their opposite ends laterally extending flanges for engaging the inner faces of opposite panels of rectangular fiberboard ducts to brace them against sagging and/or buldging caused by air-pressure-difference and/or gravitational forces. The inner tube has a series of notches or apertures formed therein and the outer tube has a tongue or pin engageable with a selected notch or aperture to lock the tubes in length-adjusted relative positions. Optionally, the opposite tube ends can have a bendable tongue or a barbed pin for penetrating through the fiberboard wall. The tongue can be bent over the outer face of the duct panel to brace the panel against outward buldging. The barbed pin can receive a pressed-on resilient nut for the same purpose. The tubes can be economically formed from sheet-metal strips bent to define, in cross-section, nearly closed triangles or nested U's.

9 Claims, 10 Drawing Figures

LENGTH-ADJUSTABLE STIFFENER FOR FIBERBOARD DUCTS

BACKGROUND AND OBJECTS OF THE INVENTION

It is known to brace the panels of rectangular sheet-metal air-ducts against inward bowing by the use of an adjustable-length rod (U.S. Pat. No. to Savage 3,557,838). But no brace is known which is especially adapted for use with soft fiberboard duct-panels and/or which braces such panels against buldging as well as against inward bowing. It is accordingly the principal object of this invention to provide such a brace. Other objects and advantages will become apparent as the following detailed description proceeds.

BRIEF DESCRIPTIONS OF THE DRAWINGS FIGURES

DETAILED DESCRIPTION

Figure 1:
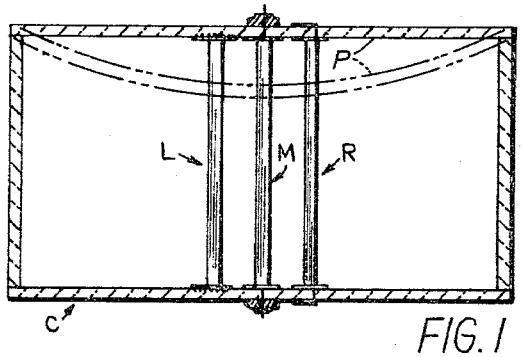
FIG. 1 is a transverse cross-sectional elevational view of a fiberboard duct showing three alternative species of the disclosure.

With reference now to the drawings, the letter C designates an air duct formed of conventional heat-insulating fiberboard panels. In FIG. 1 there are shown three species of the generic disclosure (only one of which would normally be employed in a single duct). The three forms are generally designated L, M and R for left, middle and right respectively. In FIG. 1 only the upper duct panel P is shown (in phantom) as sagging, although the lower one would also either buldge upwardly or also sagg less if the duct pressure were below atmospheric. Above-atmospheric pressure would tend to cause both the top and bottom to buldge outwardly in the absence of brace M or R.

FIG. 2-6 disclose the left (L) species, which comprises basically an outer rod 11, an inner rod 13 and end disks 15. The inner rod 13 is shown as formed of a sheet-metal strip bent about longitudinal fold lines to define a hollow body triangular in transverse cross-section, although it could be a (hollow) plastic body of circular cross-section. The outer rod 11 is similarly formed and snugly telescopically embraces the rod 13. The bight portion of the inner rod 13 is provided with spaced depressions or slots 17 for locking engagement by the latch 19 of a bendable tongue 21 struck out from the upper bight portion of the outer rod 11.

Figure 6:
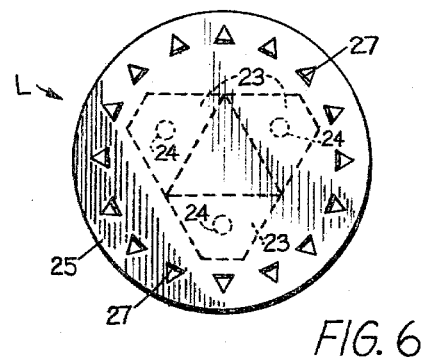
FIG. 6 is a further enlarged plan view of the left brace of FIG. 1.
Figure 2:
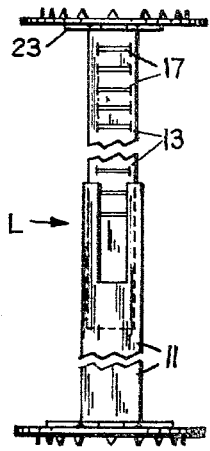
FIG. 2 is an enlarged elevational view of the left brace of FIG. 1.
Figure 3:
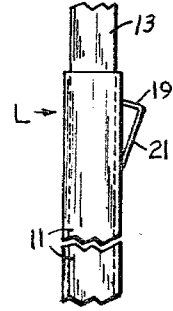
FIG. 3 is an enlarged fragmentary elevational of the left brace as seen from the right in FIG. 1.
Figure 4:
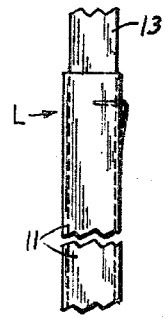
FIG. 4 is a view like FIG. 3 but showing the length-adjusting bendable tongue in its locking position.
Figure 5:
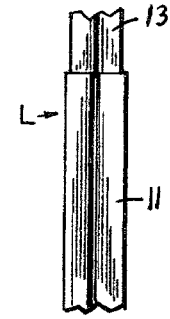
FIG. 5 is an enlarged elevational view of the left brace as seen from the rear thereof in FIG. 1.

Both rods have their outer ends severed sufficiently to define tabs 23 which are bent laterally for being spot-welded at 24 to sheet-metal capping disks 25 (FIGS. 2 and 6). The disks 25 are desirably provided with struck-out short pointed fingers 27 for non-slipping penetration into the relatively soft duct panels.

Figure 7:
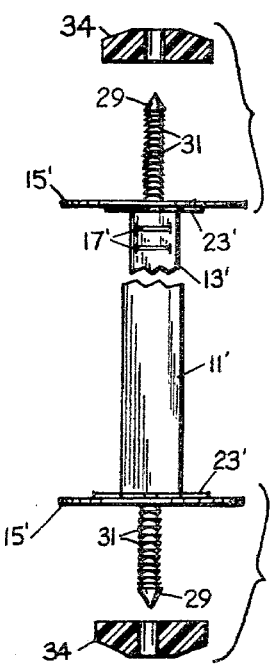
FIG. 7 is an elevational view of the middle brace of FIG. 1.

In FIG. 7 the M species of the disclosure is shown as being similarly formed by rods 11' and 13' and capped by disks 15'. The disks 15' are spot-welded to the bent-out tabs 23'. Axially of the rods there are fixed (as by welding) a pair of pins 29 provided with barb-like rings 31 for engagement by resilient press-on nuts 33 of known construction. The pins 29 penetrate the fiberboard panels, and the nuts then clamp the panels against the disks 15' so that the panels are held against inward bending or outward buldging when the ducts are subjected to either above-or-below-normal atmospheric pressure.

Figure 9:
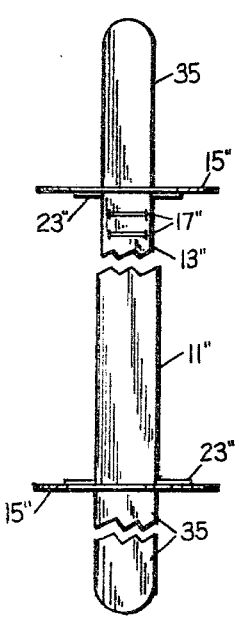
FIG. 9 is an elevational view of the right brace, with its external panel-penetrating tongue extended, viewed from right of FIG. 8.
Figure 8:
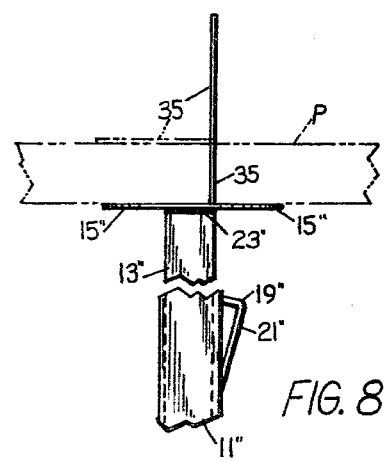
FIG. 8 is a fragmentary elevational view of the right brace of FIG. 1, with its panel-penetrating tongue extended.

In FIGS. 8, 9, the rods 11'' and 13'' are formed in the same manner as in FIGS. 2–5 and are capped by disks 15'' (with or without bentout penetrating fingers like 27 in FIGS. 2 and 6). The bight portions of rods 11'' and 13'' are extended to define panel-penetrating fingers 35 which are to be bent-over to clamp the fiberboard panels against the disks 15''.

In FIGS. 7–9 double-primed numerals designate parts corresponding to parts bearing unprimed reference numerals in FIGS. 2–6.

Figure 10:
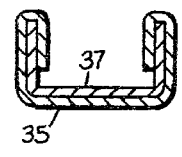
FIG. 10 is a plan view in transverse section of modified rod shapes.

FIG. 10 shows, in transverse cross-section, a modified construction of the sheet-metal telescoping rods 35 and 37. The inner rod 37 is U-shaped in section and its bight portion will have a row of spaced slots or indentations like 17 in FIG. 2. The outer rod 35 is also U-shaped but its side flanges are initially longer so as to be bendable over the edges of the side flanges of the inner rod 37 to form retaining and guiding slide channels, as shown.

The invention having been described what is claimed is:

1. In the combination of a fiberboard airduct and at least one space-bridging brace transversely disposed therein, said brace being the improvement and comprising: a pair of telescopically mating rods, manually operable means interactuable between said rods for locking them in length-adjusted relative positions, large-area transaxially extending flange-like means fixed to and short of the ends of said rods for bracingly engaging against the inner surfaces of opposed duct panels, and at least one thin duct-panel-penetrating finger extending beyond the outer faces of each of said flange-like means.

2. A combination according to claim 1 wherein at least the outer rod is made of bendable strap-metal and has an L-shaped tongue struck-out therefrom adjacent its telescoping end, said tongue having an outwardly angled base portion and an inwardly bent integral tip, and wherein the inner rod has a longitudinal row of recesses selectively engageable by said inwardly bent tip on said L-shaped tongue to fasten said rods in desired length-adjusted relative positions.

3. A combination according to claim 1 wherein both of said flange-like means have a plurality of panel-penetrating fingers protruding from the panel-engaging faces thereof for preventing lateral movement along the faces of said panels.

4. A combination according to claim 1 wherein both of the rods have sharp-ended panel-penetrating shafts extending axially from their panel-engaging ends and having serrated surfaces, and wherein said brace includes nut-like elements engageable with said serrated shafts to clamp duct panels against said flange-like means to brace said panels against either inward or outward bending.

5. A combination according to claim 4 wherein said nut-like means are formed of yieldable plastic material and are constructed for press-fit holding-engagement with said serrated surfaces of said shafts.

6. A combination according to claim 1 wherein each rod is formed of a metal strap bent along longitudinal lines to three-strip channel bars, and wherein the middle strips of the bent straps are extended through and beyond said flange-like means to provide panel-penetrating tongues adapted for being bent over the outer surfaces of duct panels to clamp said panels against said flange-like means for bracing said panels against either inward or outward bending.

7. A combination according to claim 6 wherein the ends of the side strips of said straps are bent to underlie said flange-like means and are fixed thereto.

8. A combination according to claim 6 wherein each channel bar is a nearly closed triangle is cross-section.

9. A combination according to claim 6 wherein each channel bar is U-shaped in cross-section and wherein the side strips of the outer channel bar has its edges bent over the edges of the side strips of the inner channel bar to form guides for the telescopic relative movement between said bars.

* * * * *